(12) United States Patent
Schepke et al.

(10) Patent No.: US 7,524,055 B2
(45) Date of Patent: Apr. 28, 2009

(54) EYEWEAR WITH LENS AND INTERLOCKING NOSEPIECE AND FRAME

(75) Inventors: Kyle Schepke, Portland, OR (US); Umar Hanif, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 241 days.

(21) Appl. No.: 11/688,040

(22) Filed: Mar. 19, 2007

(65) Prior Publication Data
US 2008/0231797 A1    Sep. 25, 2008

(51) Int. Cl.
*G02C 1/04*    (2006.01)
(52) U.S. Cl. .................. 351/103; 351/106; 351/138; 351/139
(58) Field of Classification Search .................... 351/41, 351/44, 103–109, 136–139, 154
See application file for complete search history.

(56) References Cited

U.S. PATENT DOCUMENTS

| | | | |
|---|---|---|---|
| 2,362,725 A | 11/1944 | Slotsky |
| 2,397,243 A | 3/1946 | Cooper, Jr. |
| 2,444,498 A | 7/1948 | Cochran |
| D150,924 S | 9/1948 | Bright |
| 2,534,655 A | 12/1950 | Baratelli |
| 2,563,125 A | 8/1951 | Malcom |
| 2,571,704 A | 10/1951 | Gilden |
| 2,607,919 A | 8/1952 | Stegeman |
| 2,770,806 A | 11/1956 | Moeller |
| 2,825,267 A | 3/1958 | Gagnon |
| D182,459 S | 4/1958 | Eisler |
| 3,066,573 A | 12/1962 | Moeller |
| 3,233,249 A | 2/1966 | Baratelli et al. |
| 3,517,393 A | 6/1970 | Beauchef |
| 3,756,704 A | 9/1973 | Marks |
| 3,838,914 A | 10/1974 | Fernandez |
| 4,317,240 A | 3/1982 | Angerman et al. |
| 4,674,851 A | 6/1987 | Jannard |
| D293,450 S | 12/1987 | Jannard |
| 4,730,915 A | 3/1988 | Jannard |
| 4,824,233 A | 4/1989 | Jannard |
| 4,951,322 A | 8/1990 | Lin |

(Continued)

FOREIGN PATENT DOCUMENTS

EP    1156356 A1    4/2001

(Continued)

OTHER PUBLICATIONS

Adidas, Twini, product promotion literature, dated at least as early as Mar. 1997.

*Primary Examiner*—Huy K Mai
(74) *Attorney, Agent, or Firm*—Banner & Witcoff, Ltd.

(57) ABSTRACT

Eyewear includes a frame having a right temple arm, a left temple arm, a first lens groove, a second lens groove, and a recess formed therein. A first lens is received in the first lens groove and has a first opening formed therein. A first tab is received in the first lens groove. A second lens is received in the second lens groove and has a second opening formed therein. A second tab is received in the second lens groove. A nosepiece has a base portion received in the recess in the frame, and engages the first and second openings to removably secure the first and second lenses to the frame.

25 Claims, 5 Drawing Sheets

U.S. PATENT DOCUMENTS

| | | |
|---|---|---|
| D324,394 S | 3/1992 | Jannard |
| 5,249,001 A | 9/1993 | Jannard |
| 5,257,050 A * | 10/1993 | Wiedner .................. 351/86 |
| 5,387,949 A | 2/1995 | Tackles |
| 5,467,148 A | 11/1995 | Conway |
| 5,555,037 A | 9/1996 | Canavan |
| 5,576,775 A | 11/1996 | Bolle |
| 5,581,312 A | 12/1996 | Chen |
| 5,760,868 A | 6/1998 | Jannard et al. |
| 5,841,505 A | 11/1998 | Bolle |
| 5,969,787 A | 10/1999 | Hall |
| 6,086,199 A | 7/2000 | Holland et al. |
| 6,196,681 B1 | 3/2001 | Canavan |
| 6,367,927 B2 | 4/2002 | Yang |
| 6,386,705 B1 | 5/2002 | Chen |
| 6,517,202 B2 | 2/2003 | Huang |
| 6,533,412 B1 | 3/2003 | Wang et al. |
| 6,783,235 B1 | 8/2004 | Lin |
| 6,991,333 B2 | 1/2006 | Van Atta et al. |
| 7,147,321 B2 | 12/2006 | Van Atta |
| 2006/0250573 A1 | 11/2006 | Van Atta |
| 2007/0252942 A1 | 11/2007 | Collier et al. |

FOREIGN PATENT DOCUMENTS

| | | |
|---|---|---|
| EP | 1184712 A1 | 3/2002 |
| FR | 2681442 A1 | 9/2002 |
| IT | 01279258 | 12/1997 |
| IT | 01279337 | 12/1997 |
| IT | 01311533 | 3/2002 |
| IT | 02245516 | 3/2002 |
| WO | 9525982 | 9/1995 |
| WO | 0036453 A1 | 6/2000 |

* cited by examiner

EYEWEAR WITH LENS AND INTERLOCKING NOSEPIECE AND FRAME

FIELD OF THE INVENTION

This invention relates generally to eyewear and, in particular, to eyewear with a lens and an interlocking nosepiece and frame.

BACKGROUND OF THE INVENTION

Eyewear is well known for use in many activities including athletic activities, such as biking, skiing, and running. The eyewear may have a multitude of constructions. For example, the eyewear may have a wraparound lens secured to a frame, commonly referred to as a shield lens, or it may have two distinct lenses secured to a frame. Performance-type wraparound lenses are often worn by athletes and other users to provide blocking of the sun's rays and protection from wind, water spray, etc. The lens, or lenses, are often secured to the frame with a screw, or screws, respectively.

It would be advantageous to simplify the manufacturing process for eyewear having one or more lenses and a nosepiece. It would be also desirable to provide eyewear that reduces or overcomes some or all of the difficulties inherent in prior known devices. Particular objects and advantages will be apparent to those skilled in the art, that is, those who are knowledgeable or experienced in this field of technology, in view of the following disclosure of the invention and detailed description of certain embodiments.

SUMMARY

The principles of the invention may be used to advantage to provide eyewear with a lens using an interlocking nosepiece and frame. In accordance with a first aspect, eyewear includes a frame having a right temple arm, a left temple arm, a first lens groove, a second lens groove, and a recess formed therein. A first lens is received in the first lens groove and has a first opening formed therein. A first tab is received in the first groove. A second lens is received in the second lens groove and has a first opening formed therein. A second tab is received in the second groove. A nosepiece has a base portion received in the recess in the frame, and engages the first and second openings to removably secure the first and second lenses to the frame.

In accordance with another aspect, eyewear includes a frame having a first lens groove, a second lens groove, and a recess formed therein. A first lens is received in the first lens groove and has a first opening formed therein. A first tab is received in the first groove. A second lens is received in the second lens groove and has a first opening formed therein. A second tab is received in the second groove. A nosepiece has a base portion, a first projection extending from the base portion and a second projection extending from the base portion. The base portion is received in the recess in the frame, the first projection engages the first opening, and the second projection engages the second opening frame. A right temple arm is pivotally secured to the frame. A left temple arm is pivotally secured to the frame.

In accordance with a further aspect, eyewear includes a frame having a first lens groove, a second lens groove, and a recess formed therein. A first lens is received in the first lens groove and has a first opening formed therein. A first tab is received in the first groove. A second lens is received in the second lens groove and has a first opening formed therein. A second tab is received in the second groove. A nosepiece has a base portion, a first arm extending downwardly and laterally from the base portion, a second arm extending downwardly and laterally from the base portion, a first projection extending outwardly from the base portion and a second projection extending outwardly from the base portion. The base portion is received in the recess in the frame, the first projection engages the first opening, and the second projection engages the second opening frame. A right temple arm is pivotally secured to the frame. A left temple arm is pivotally secured to the frame.

Substantial advantage is achieved by providing eyewear with a lens using an interlocking frame and nosepiece. By securing a nosepiece to a central portion of a frame, the outer portions of the lens remain free from the frame, improving ventilation, providing enhanced aesthetics, and providing improved peripheral vision for the user. Additionally, certain embodiments provide the ability to install lenses in the frame in a simplified manner, helping improve manufacturability and reduce manufacturing costs.

These and additional features and advantages disclosed here will be further understood from the following detailed disclosure of certain embodiments.

Figure 1:
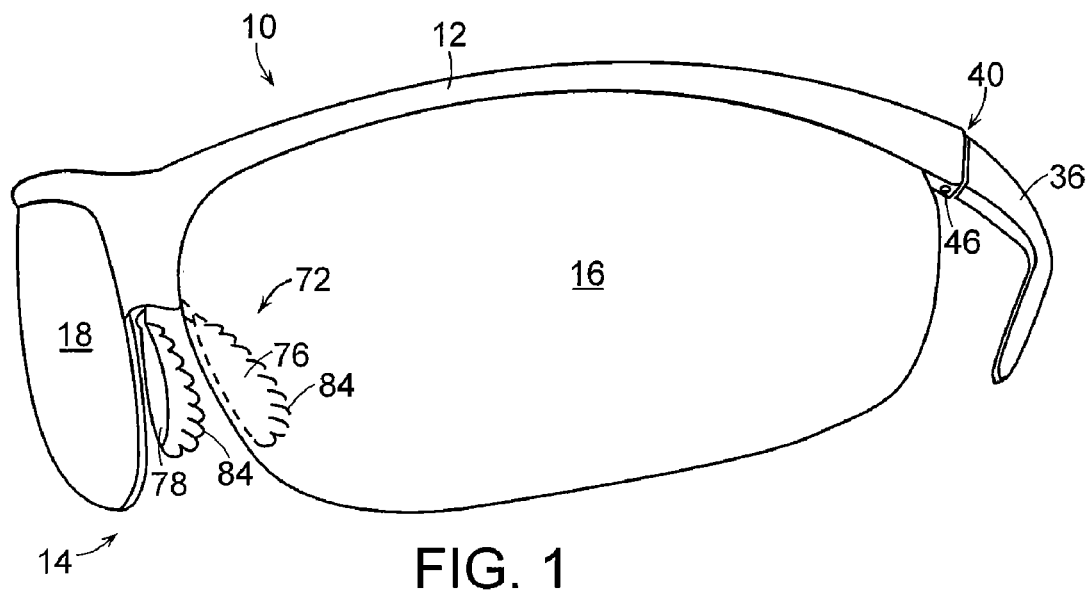
FIG. 1 is a front perspective view of eyewear with a frame and interlocking nosepiece.

The figures referred to above are not drawn necessarily to scale and should be understood to provide a representation of the invention, illustrative of the principles involved. Some features of the eyewear depicted in the drawings have been enlarged or distorted relative to others to facilitate explanation and understanding. The same reference numbers are used in the drawings for similar or identical components and features shown in various alternative embodiments.

Eyewear as disclosed herein would have configurations and components determined, in part, by the intended application and environment in which they are used.

DETAILED DESCRIPTION OF CERTAIN PREFERRED EMBODIMENTS

Figure 2:
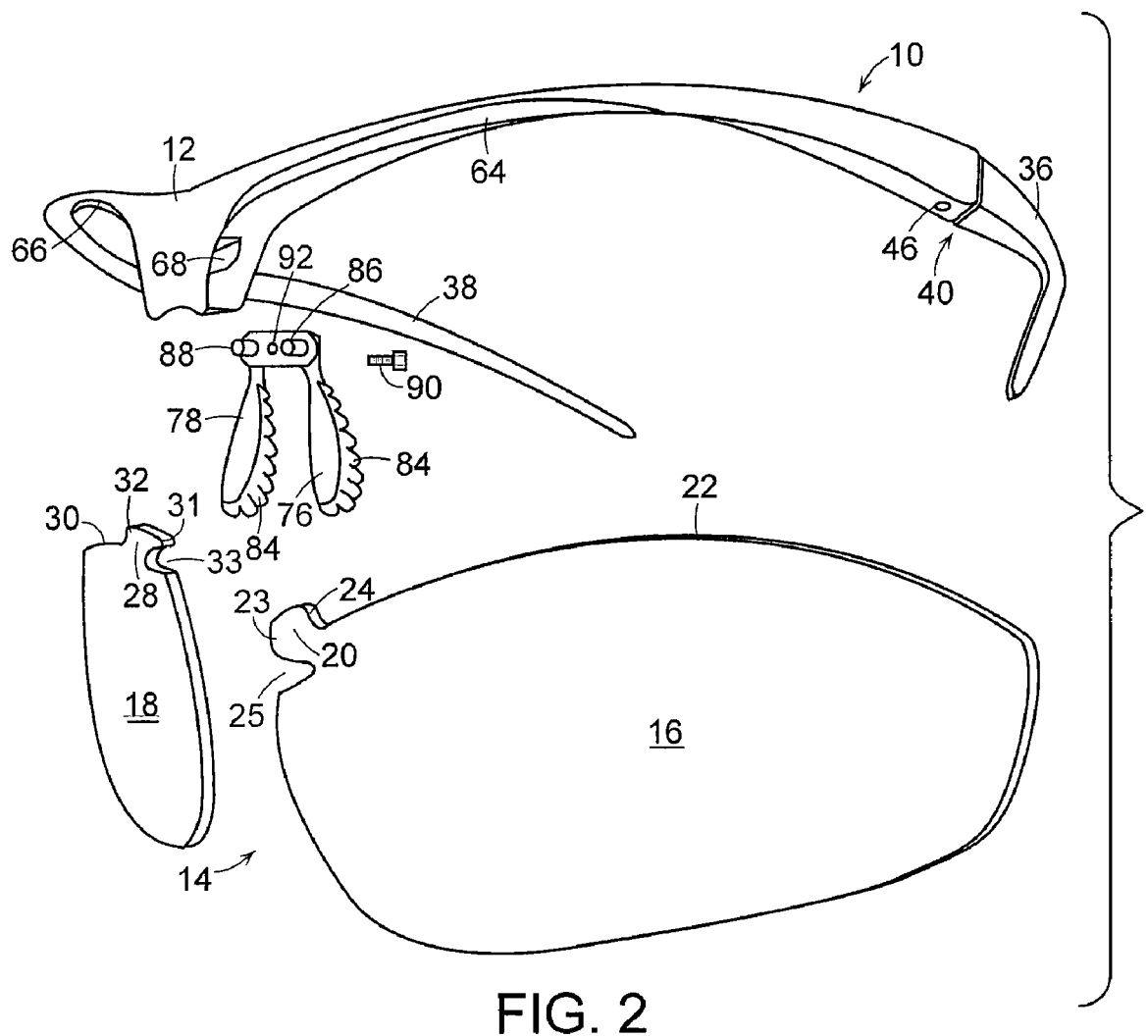
FIG. 2 is an exploded front perspective view of the eyewear of FIG. 1.
Figure 3:
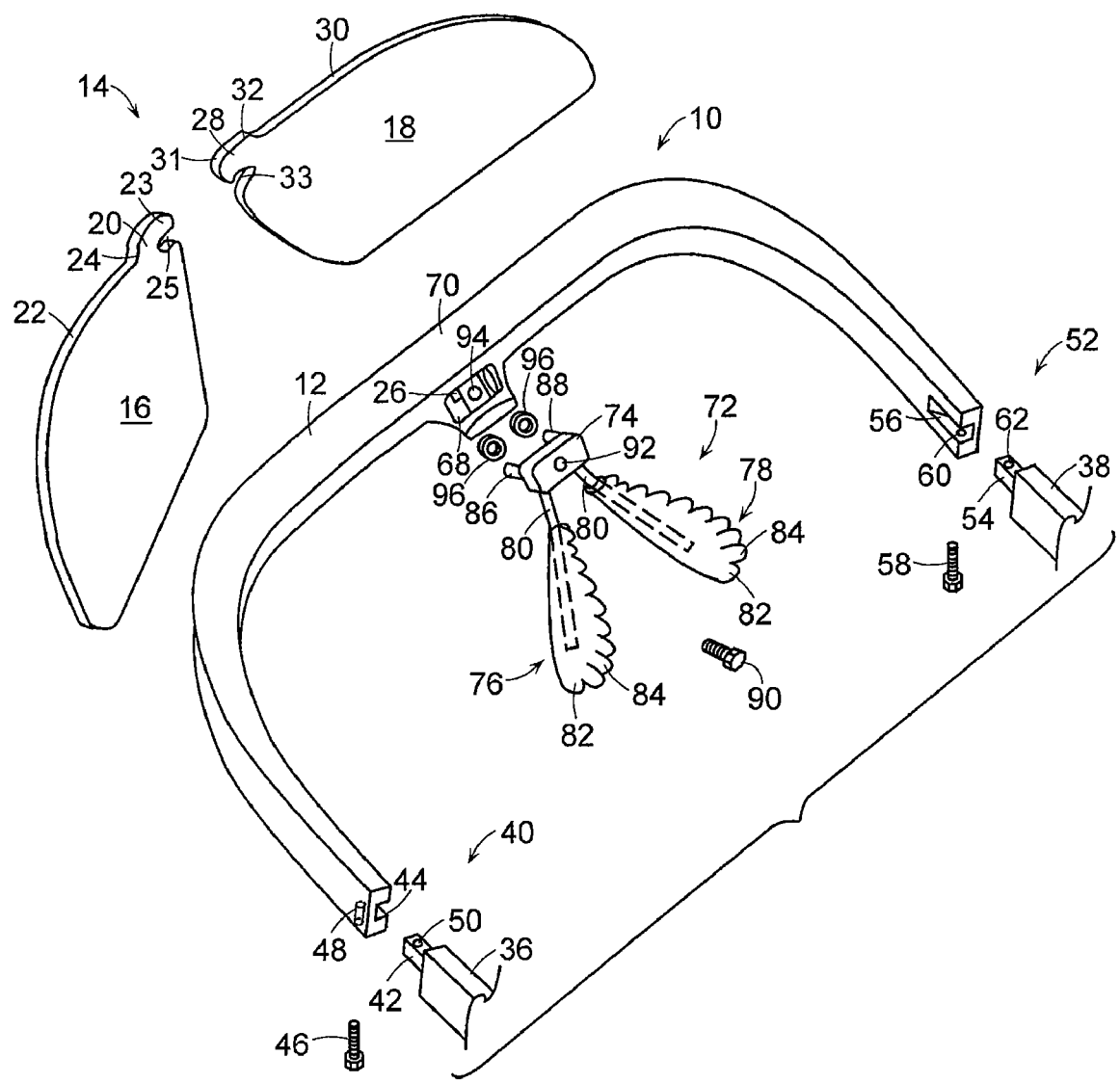
FIG. 3 is an exploded rear perspective view of the eyewear of FIG. 1.

The present invention may be embodied in various forms. A preferred embodiment of eyewear 10 is shown in FIGS. 1-3. In particular, the embodiments depicted herein illustrate use of the present invention as performance sunglasses, often used by bicycle riders and runners. However, it is to be appreciated that eyewear 10 is meant to include not only performance sunglasses, but rather, all types of glasses, including, for example, prescription glasses and safety glasses.

Certain directional terms used herein refer to directions with respect to the wearer of eyewear 10.

Thus, the terms outward, outwardly, forward, and forwardly, as used herein, refer to a surface facing away from, or a direction extending away from, or an element spaced from, the face of a wearer of eyewear 10. The terms inward, inwardly, rear, and rearwardly refer to a surface facing toward, or a direction extending toward, the face of a wearer of eyewear 10. The terms left and right and laterally are considered to be to the left and right sides with respect to the wearer of eyewear 10. Thus, for example, left of, or to the left, refers to a direction toward the wearer's left.

Eyewear 10 includes a frame 12 and a lens 14 secured to frame 12. Frame 12 may be formed of a rigid material, for example, a fiber-reinforced material such as a carbon fiber composite, providing a rigid structure and support for lens 14. In other embodiments, frame 12 may be formed of plastic, metal, a composite material, or a rubber-coated core material, such as metal or plastic. Other suitable materials for frame 12 will become readily apparent to those skilled in the art, given the benefit of this disclosure.

In certain embodiments, lens 14 is formed of a first or left lens 16 and a second or right lens 18.

Figure 6:
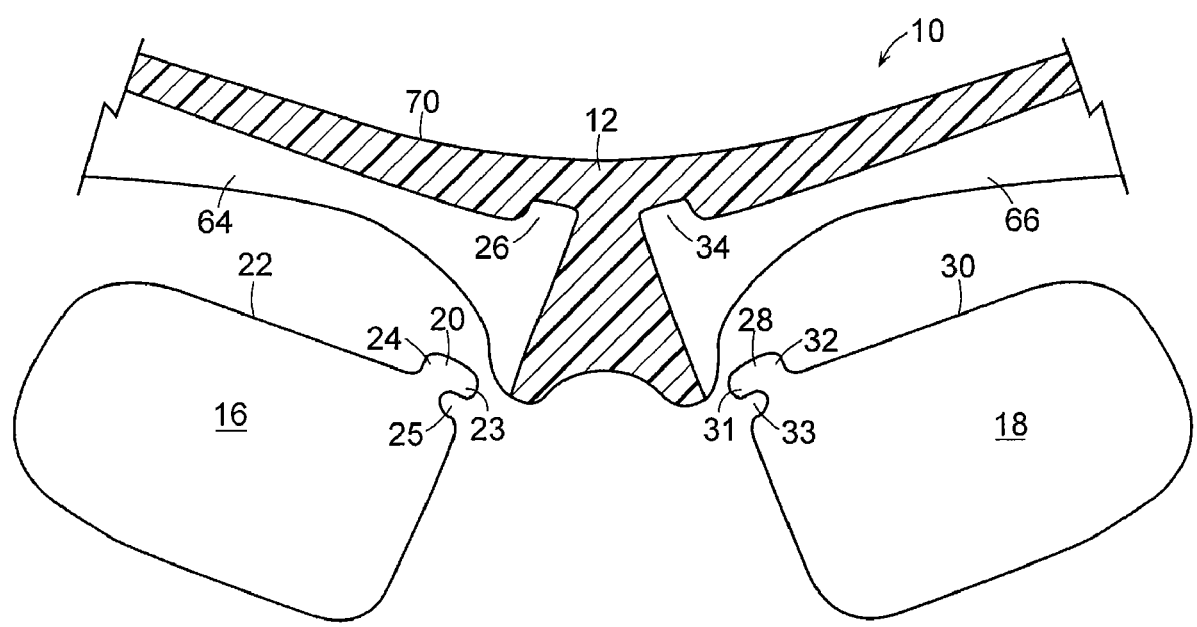
FIG. 6 is a rear elevation view, shown partially cut away, of the lenses and frame of the eyewear of FIG. 1, prior to insertion of the lenses in the frame.

Left lens 16 and right lens 18 are removably secured to frame 12. A first tab 20 is formed on an interior end of an upper edge 22 of left lens 16, and has a first end 23 and a second end 24 positioned outwardly and to the left of first end 23. A first opening 25 is formed in left lens 16, below first end 23 of first tab 20. First end 23 and second end 24 of first tab 20 are captured within a first groove 26 formed in frame 12, seen more clearly in FIG. 6 and discussed in greater detail below. In the illustrated embodiment, first opening 25 is a notch formed in left lens 16.

Similarly, a second tab 28 is formed on an interior end of an upper edge 30 of right lens 18, having a first end 31 and a second end 32 positioned outwardly and to the right of first end 31. A second opening 33 is formed in right lens 18, below first end 31 of second tab 28. First end 31 and second end 32 of second tab 28 are captured within a second groove 34 formed in frame 12, seen more clearly in FIG. 6 and discussed in greater detail below. In the illustrated embodiment, second opening 33 is a notch formed in right lens 18.

A first or left temple arm 36 is secured to frame 12. Similarly, a second or right temple arm 38 is secured to frame 12. In certain embodiments, left temple arm 36 and right temple arm 38 are pivotally secured to frame 12. In other embodiments, it is to be appreciated that left temple arm 36 and right temple arm 38 may be rigidly secured to frame 12, or they may be of unitary, that is, one-piece construction with frame 12.

Temple arms 36, 38 may be formed of any suitable material, including, for example, plastic, metal, a composite material, or a rubber coated core material, such as metal or plastic. In certain preferred embodiments, temple arms 36, 38 are formed of magnesium, or a flexible, resilient material, such as beta titanium. In other embodiments, temple arms 36, 38 may be formed of a rigid material, such as a fiber-reinforced material, e.g., a carbon fiber composite. Other suitable materials for temple arms 36, 38 will become readily apparent to those skilled in the art, given the benefit of this disclosure.

In the illustrated embodiment, a hinge 40 pivotally connects left temple arm 36 to frame 12.

Hinge 40 includes a tab 42 that extends outwardly from left temple arm 36 and which is received in a slot or recess 44 formed in frame 12. A fastener such as a pin or screw 46 extends through an aperture 48 formed in frame 12 and an aperture 50 formed in tab 42, thereby pivotally securing tab 42 within recess 44. It is to be appreciated that alternatively a tab could be formed on frame 12 with a corresponding recess formed in left temple arm 36. Other suitable hinge mechanisms will become readily apparent to those skilled in the art, given the benefit of this disclosure.

Similarly, a hinge 52 pivotally connects right temple arm 38 to frame 12. Hinge 52 includes a tab 54 that extends outwardly from right temple arm 38 and which is received in a recess 56 formed in frame 12. A fastener such as a pin or screw 58 extends through an aperture 60 formed in frame 12 and an aperture 62 formed in tab 42, thereby pivotally securing tab 54 within recess 56. It is to be appreciated that fasteners 46, 58 may be bolts or rivets or any other suitable fastener that will adequately pivotally secure tabs 42, 54 to frame 12. It is to be appreciated that alternatively a tab could be formed on frame 12 with a corresponding recess formed in right temple arm 38. Other suitable hinge mechanisms will become readily apparent to those skilled in the art, given the benefit of this disclosure. For example, in certain embodiments, the hinge mechanisms may include a cam and/or spring combination, providing a snap-open and snap-closed operation of temple arms 36, 38. Such mechanisms are well known to those skilled in the art, and further description need not be provided here.

At least a portion of upper edge 22 of left lens 16 may be captured or received within a left lens groove 64 formed in frame 12. Similarly at least a portion of upper edge 30 of right lens 18 may be captured or received within a right lens groove 66 formed in frame 12

Although lens 14 is depicted here as being formed of two lenses, it is to be appreciated that in certain embodiments, lens 14 could be a single lens.

A recess 68 is formed in a rear surface and proximate a top edge 70 of frame 12. Recess 68 is in fluid communication with first groove 26, second groove 34, left lens groove 64 and right lens groove 66.

A nosepiece 72 is secured to a rear surface of frame 12. Nosepiece 72 includes a base portion 74, at least a portion of which is received in recess 68. Nosepiece 72 includes a first arm 76 and a second arm 78, each of which extends downwardly and laterally from base portion 72. In the illustrated embodiment, each of first arm 76 and second arm 78 is formed of a core member 80 with an outer member 82 seated on core member 80.

Core member 80 may be formed of a material that is hand bendable, that is, it can be bent to a new shape or configuration by a user by hand without the use of any tools. Core member 80 may be formed of metal such as nickel silver, steel, or monel. Providing core member 80 of a material that is hand bendable allows a user to mold nosepiece 72 to a desired configuration to fit their nose most comfortably.

In various embodiments, outer member 82 is formed of a resilient material such as an elastomer.

Suitable materials for outer member 82 include rubber, thermoplastic urethane (TPU), and hydrophilic materials (e.g., Megol™, available from Smith Sport Optics, Inc., of Ketchum, Id.). In certain embodiments, outer member 82 may be overmolded around core member 80.

A plurality of rearwardly extending fins 84 may be formed on a rear surface of first arm 76 and second arm 78. In the illustrated embodiment, fins 84 are of unitary construction with outer members 82. Fins 84 rest on the bridge of the user's nose when eyewear 10 is worn by the user, and provide a positive gripping surface, reducing the chance of eyewear 10 slipping off the user's nose, and also provide additional ventilation. Fins 84 may be formed of rubber, which serves to provide good grip, plastic, or any other suitable material.

A first projection 86 and a second projection 88 are formed on and extend forwardly from base portion 74. To assemble eyewear 10, left lens 16 is inserted into left lens groove 64 with first tab 20 being captured in first groove 26. Right lens 18 is inserted into right lens groove 66 with second tab 28 being captured in second groove 34. Base portion 74 of nosepiece 72 is then inserted into recess 68 in frame 12. A fastener such as a screw 90 is threaded through a first aperture 92 formed in nosepiece 72 and a second aperture 94 formed in frame 12, thereby securing nosepiece 72 to frame 12.

It is to be appreciated that other types of fasteners 90 are suitable for securing nosepiece 72 to frame 12 including, for example, bolts, clips, snap-fit fastening members, etc. Other suitable fasteners will become readily apparent to those skilled in the art, given the benefit of this disclosure.

Figure 4:
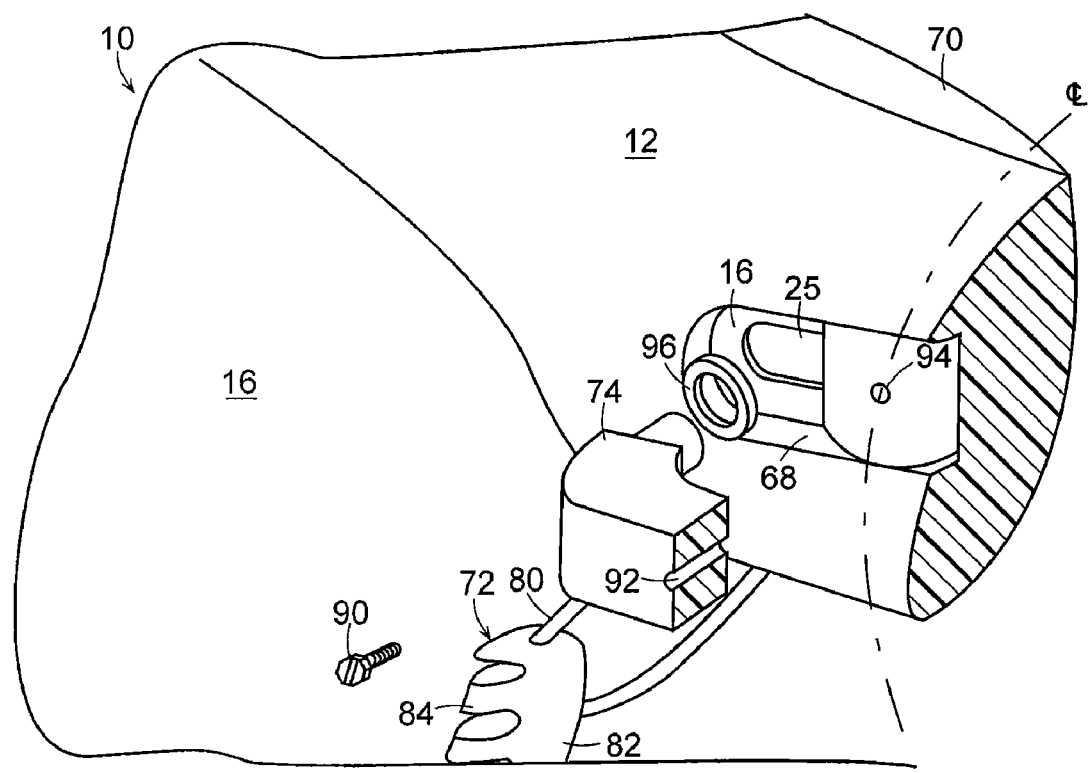
FIG. 4 is a perspective view, shown partially cut away, of the nosepiece and frame of the eyewear of FIG. 1, prior to engagement of the nosepiece with the frame.
Figure 5:
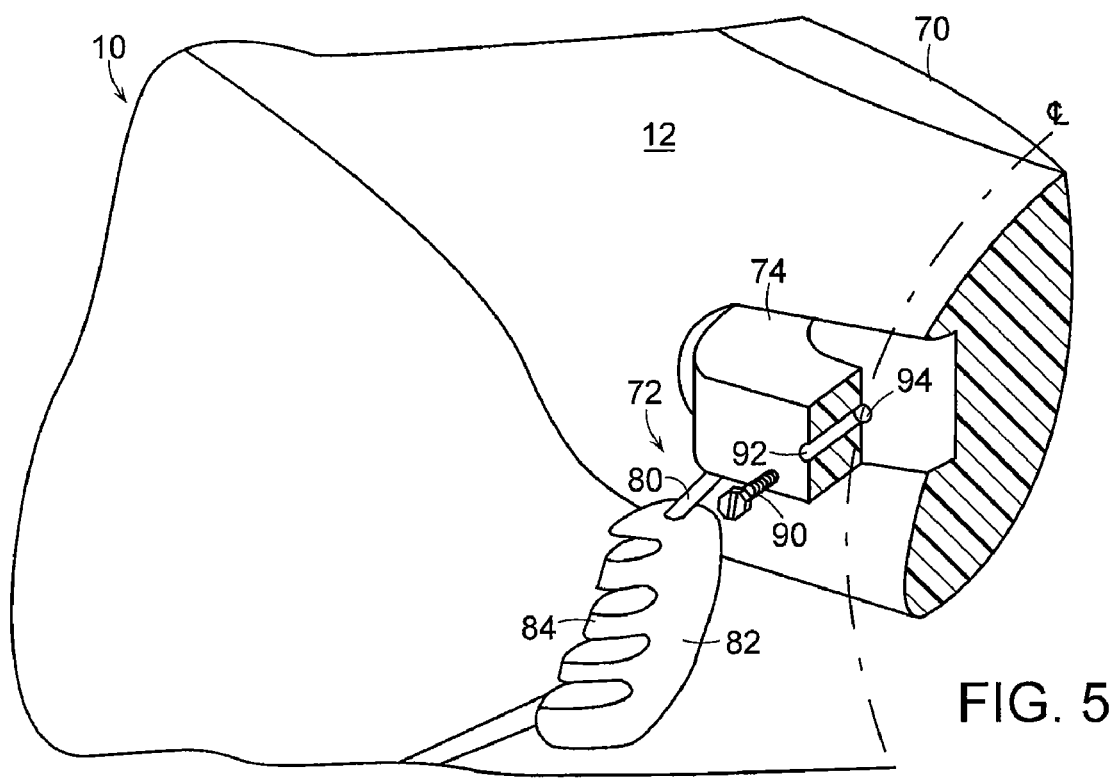
FIG. 5 is a perspective view, shown partially cut away, of the nosepiece and frame of the eyewear of FIG. 1, shown in an engaged condition prior to the screw securing the nosepiece to the frame.

As seen in FIGS. 4-5, when left lens 16 is seated in frame 12, first opening 25 is exposed within recess 68. When base portion 74 of nosepiece 72 is inserted into recess 68, first projection 86 is inserted into opening 25. The engagement of opening 25 of left lens 16 with first projection 86 serves to help secure left lens 16 to frame 12. Similarly, second opening 33 of right lens 18 is engaged with second projection 88 of nosepiece 72, thereby helping secure right lens 18 to frame 12. The use of a nosepiece with projections that engage corresponding openings in the lens or lenses improves manufacturability of eyewear 10, and allows each of left and right lens 16, 18 to be easily removed and replaced.

As illustrated here, first projection 86 and second projection 88 are substantially cylindrical.

However, it is to be appreciated that they may have any desired shape that is suitable for engaging first and second openings 25, 33, respectively.

In certain embodiments, as illustrated in FIGS. 3-4, a gasket 96 is provided on each of first projection 86 and second projection 88. Gaskets 96 may be formed of a resilient material such as an elastomer or rubber, for example. In certain embodiments, gaskets 96 are O-rings. In other embodiments, gaskets 96 can be secured to base portion 74 at the bases of first and second projections 86, 88, such as by co-molding. The resilience of gaskets 96 allow for lenses of different thicknesses to be used in eyewear 10, compensating for the different thickness and ensuring a tight fit of the elements of eyewear 10.

Under certain conditions, one or both lenses of eyewear 10 may become scratched, diminishing the effectiveness of the lens or lenses. Additionally, users may wish to use different lenses for different lighting conditions or different activities. Consequently, there are certain circumstances under which the user desires to replace one or more lenses. Therefore, it may be advantageous for the user to be able to replace a lens or lens in eyewear 10 in a simplified manner, while ensuring that the lens or lenses are adequately secured to frame 12.

Figure 7:
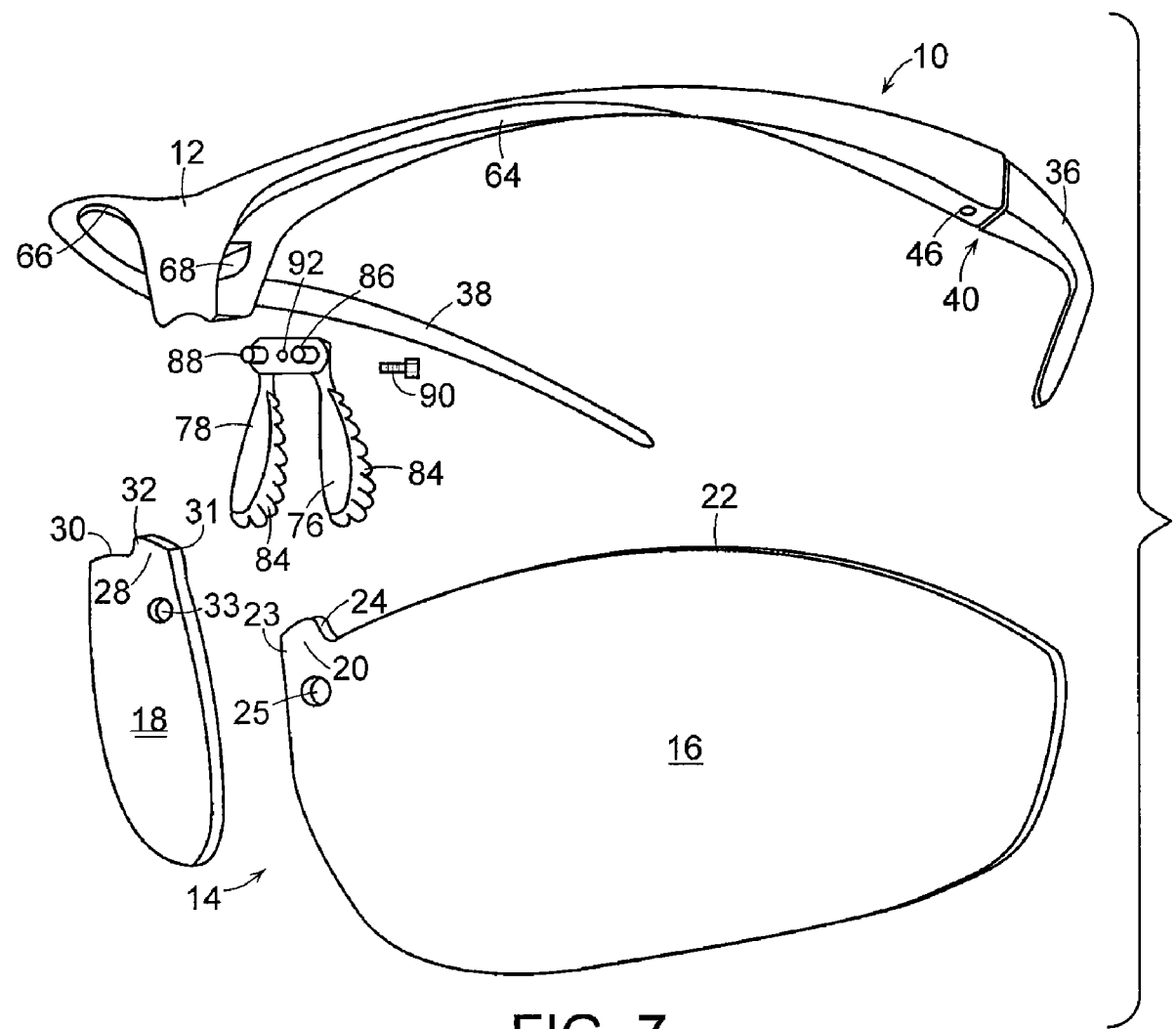
FIG. 7 is a front perspective view of another embodiment of eyewear with a frame and interlocking nosepiece.

Another embodiment is shown in FIG. 7, in which first opening 25 is an aperture extending through left lens 16. Similarly, second opening 33 is an aperture extending through right lens 18.

It is to be appreciated that first opening 25 and second opening 33 can have any desired shape suitable for engaging projections 86, 88 of nosepiece 72.

In light of the foregoing disclosure of the invention and description of various embodiments, those skilled in this area of technology will readily understand that various modifications and adaptations can be made without departing from the scope and spirit of the invention. All such modifications and adaptations are intended to be covered by the following claims.

What is claimed is:

1. Eyewear comprising, in combination:
   a frame having a right temple arm, a left temple arm, a first lens groove, a second lens groove, and a recess formed therein;
   a first lens received in the first lens groove and having a first opening formed therein and a first tab being received in the first lens groove;
   a second lens received in the second lens groove and having a second opening formed therein and a second tab being received in the second lens groove; and
   a nosepiece having a base portion received in the recess in the frame and engaging the first and second openings to removably secure the first and second lenses to the frame.

2. The eyewear of claim 1, wherein the base portion includes a first projection that engages the first opening and a second projection that engages the second opening.

3. The eyewear of claim 1, further comprising:
   a first aperture in the base portion of the nosepiece;
   a second aperture formed in the frame; and;
   a fastener extending through the first aperture and the second aperture to secure the nosepiece to the frame.

4. The eyewear of claim 3, wherein the fastener is a screw.

5. The eyewear of claim 1, wherein the nosepiece includes a plurality of rearwardly projecting fins.

6. The eyewear of claim 1, wherein the nosepiece includes a first arm extending downwardly and laterally from the base portion and a second arm extending downwardly and laterally from the base portion.

7. The eyewear of claim 6, wherein the first arm is formed of a core member and an outer member substantially encasing the core member.

8. The eyewear of claim 7, further comprising a plurality of rearwardly projecting fins on the outer member.

9. The eyewear of claim 6, wherein the second arm is formed of a core member and an outer member substantially encasing the core member.

10. The eyewear of claim 9, further comprising a plurality of rearwardly projecting fins on the outer member.

11. The eyewear of claim 1, wherein at least one of the first opening and the second opening is a notch.

12. The eyewear of claim 1, wherein at least one of the first opening and the second opening is an aperture.

13. Eyewear comprising, in combination:
   a frame having a first lens groove, a second lens groove, and a recess formed therein;
   a first lens received in the first lens groove and having a first opening formed therein and a first tab being received in the first lens groove;
   a second lens received in the second lens groove and having a second opening formed therein and a second tab being received in the second lens groove;
   a nosepiece having a base portion, a first projection extending from the base portion and a second projection extending from the base portion, the base portion being received in the recess in the frame, the first projection engaging the first opening, and the second projection engaging the second opening frame;
   a right temple arm pivotally secured to the frame; and
   a left temple arm pivotally secured to the frame.

14. The eyewear of claim 13, further comprising:
   a first aperture in the base portion of the nosepiece;
   a second aperture formed in the frame; and;
   a fastener extending through the first aperture and the second aperture to secure the nosepiece to the frame.

15. The eyewear of claim 14, wherein the fastener is a screw.

16. The eyewear of claim 13, wherein the nosepiece includes a plurality of rearwardly projecting fins.

17. The eyewear of claim 13, wherein the nosepiece includes a first arm extending downwardly and laterally from the base portion and a second arm extending downwardly and laterally from the base portion.

18. The eyewear of claim 17, wherein the first arm is formed of a core member and an outer member substantially encasing the core member.

19. The eyewear of claim 18, further comprising a plurality of rearwardly projecting fins on the outer member.

20. The eyewear of claim 17, wherein the second arm is formed of a core member and an outer member substantially encasing the core member.

21. The eyewear of claim 20, further comprising a plurality of rearwardly projecting fins on the outer member.

22. Eyewear comprising, in combination:
   a frame having a first lens groove, a second lens groove, and a recess formed therein;
   a first lens received in the first lens groove and having a first opening formed therein and a first tab being received in the first lens groove;
   a second lens received in the second lens groove and having a second opening formed therein and a second tab being received in the second lens groove;
   a nosepiece having a base portion, a first arm extending downwardly and laterally from the base portion, a second arm extending downwardly and laterally from the base portion, a first projection extending outwardly from the base portion and a second projection extending outwardly from the base portion, the base portion being received in the recess in the frame, the first projection engaging the first opening, and the second projection engaging the second opening frame;
   a right temple arm pivotally secured to the frame; and
   a left temple arm pivotally secured to the frame.

23. The eyewear of claim 22, further comprising:
   a first aperture in the base portion of the nosepiece;
   a second aperture formed in the frame; and;
   a screw extending through the first aperture and the second aperture to secure the nosepiece to the frame.

24. The eyewear of claim 22, further comprising a plurality of rearwardly projecting fins on each of the first and second arms.

25. The eyewear of claim 22, wherein each of the first arm and second arm is formed of a core member and an outer member substantially encasing the core member.

* * * * *